United States Patent [19]

Walter

[11] 4,389,204

[45] Jun. 21, 1983

[54] RESILIENT SHAFT COUPLING, MORE PARTICULARLY AN INTERPOSED CARDAN SHAFT COUPLING

[75] Inventor: Jürgen Walter, Haltern, Fed. Rep. of Germany

[73] Assignee: Hackforth GmbH & Co. KG, Herne, Fed. Rep. of Germany

[21] Appl. No.: 248,029

[22] Filed: Mar. 26, 1981

[30] Foreign Application Priority Data

Mar. 29, 1980 [DE] Fed. Rep. of Germany ....... 3012411

[51] Int. Cl.³ .............................................. F16D 3/78
[52] U.S. Cl. ........................................ 464/91; 464/95
[58] Field of Search ....................... 464/91, 92, 93, 94, 464/95, 96, 71, 72

[56] References Cited

U.S. PATENT DOCUMENTS

| 2,067,285 | 1/1937 | Pearce | 464/95 |
| 2,846,856 | 8/1958 | Hagenlocher | 464/95 |
| 3,813,897 | 6/1974 | Hiersig et al. | 464/91 |
| 4,175,406 | 11/1979 | Downey | 464/91 |

FOREIGN PATENT DOCUMENTS 2812780 9/1979 Fed. Rep. of Germany .

Primary Examiner—Stuart S. Levy
Assistant Examiner—Daniel P. Stodola
Attorney, Agent, or Firm—Becker & Becker, Inc.

[57] ABSTRACT

A resilient shaft coupling. The parts of the coupling are supported by being radially braced against one another, but are movable relative to one another to a limited extent in the axial direction. One of the parts of the coupling contains an outer flange secured to a cylindrical jacket, the free end of which merges into an inwardly projecting flange. The other, inner part of the coupling contains a matching flange to which a bearing ring is rigidly secured and has an external collar coaxial with the axis of rotation and separated by a narrow annular gap from the inner wall of the jacket. The gap contains at least one bearing bushing which is adjacent the collar and jacket and radially braces parts against one another without preventing axial motion thereof. The parts are interconnected by at least one resilient annular member secured on one side to the matching flange and on the other side to the outer flange. Advantageously, the shaft coupling is constructed so as to contain two resilient annular members which are disposed in mirror image relationship relative to the central bearing ring and transmit equal parts of the total torque.

4 Claims, 1 Drawing Figure

RESILIENT SHAFT COUPLING, MORE PARTICULARLY AN INTERPOSED CARDAN SHAFT COUPLING

The present invention relates to a resilient shaft coupling, especially an interposed cardan shaft coupling, in which the driving and the driven part are interconnected by at least one resilient annular member, and the two parts are radially braced against one another yet have limited freedom of axial movement. A resilient shaft coupling of this type is known from German Offenlegungsschrift 28 12 780.

BACKGROUND OF THE INVENTION

If axial shafts may occur in operation between two machines or units interconnected by Cardan shafts, the Cardan shafts are connected by specially designed resilient couplings, also called "interposed cardan-shaft couplings". Due to the special nature of the cardan shafts, the couplings in such cases must be resilient, the parts of the coupling being radially braced against one another.

DESCRIPTION OF THE PRIOR ART

To this end, in the known resilient shaft coupling, the two parts are provided with bearings which operate in the radial direction, and are substantially in the form of intermediate rings which positively engage in corresponding recesses in the outer part of the coupling, and are designed so that the two parts have limited freedom of axial movement. This coupling meets operational requirements in all respects, but it is time-consuming and therefore expensive to manufacture, due to the precision machining required for the interlocking surfaces.

FIELD OF THE INVENTION

It is an object of the present invention to provide a resilient shaft coupling of the aforementioned type which is made of structurally simple, cheaply-manufactured components, is reliable in operation, and meets operating requirements in the same manner as other, more complicated couplings.

BRIEF DESCRIPTION OF DRAWING

This object, and other objects and advantages of the present invention, will appear more clearly from the following specification in connection with the accompanying drawing; briefly the drawing of FIG. 1 shows one inventive embodiment of a resilient shaft coupling as an axial cross section through part of the coupling.

SUMMARY OF THE INVENTION

Figure 1:
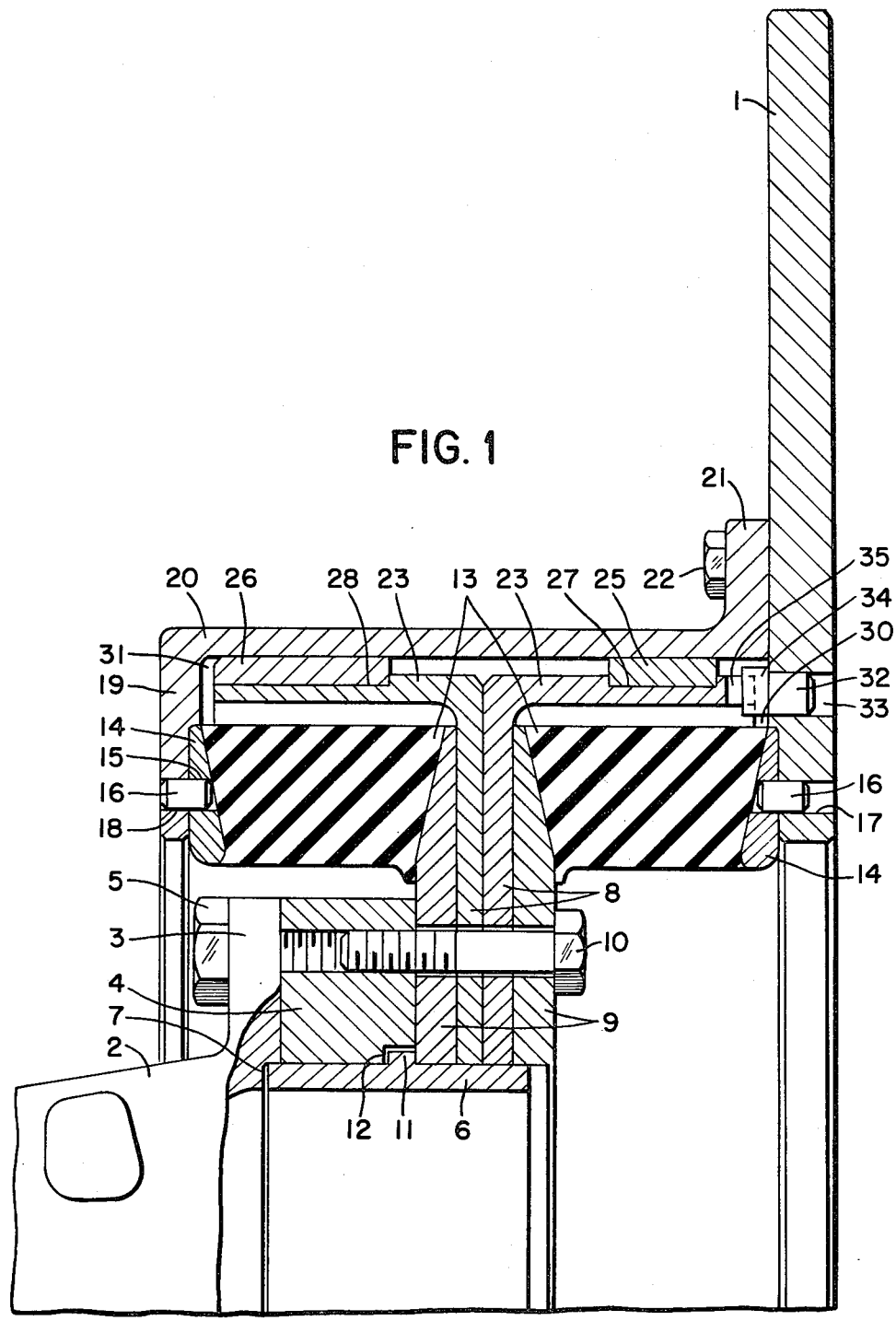

The resilient shaft coupling of the present invention is characterized primarily by the following features:

(a) A cylindrical jacket, concentric with the axis of rotation, is secured to an outer flange of one part of the coupling and has an inwardly projecting flange, perpendicular to the axis of rotation, at its free end;

(b) A bearing ring is rigidly secured to the other, inner part of the coupling, which is in the form of a matching flange, and the bearing ring has an outer collar which is coaxial with the axis of rotation, extends towards the outer flange, and is separated by a narrow annular gap from the inner wall of the jacket;

(c) At least one bearing bushing is disposed adjacent the collar and the jacket in the annular gap; and (d) A resilient annular member is disposed in the collar near its wall and is non-rotatably secured to the matching flange and the outer flange.

Advantageously, the shaft coupling is constructed in such a way as to comprise two resilient annular members, each transmitting half the torque. According to another feature of the invention, a shaft coupling of the aforementioned kind is constructed as follows: Two bearing rings having a collar and a bearing bushing, and two resilient annular members, are disposed back to back on the matching flange and in mirror image relationship relative to a central plane, which is transverse to the axis of rotation, the outside of the outer resilient annular member being non-rotatably secured to the flange of the jacket.

Advantageously, the resilient annular members are made of an elastomeric material, such as rubber or the like. Their end faces are advantageously provided with rigid securing rings which are secured to the resilient member by conventional methods, e.g. by vulcanizing. According to another embodiment of the invention, the securing rings on those end faces of the resilient annular members facing one another are radially inwardly extended beyond the thickness of the resilient annular member and, together with the bearing rings, are secured to the matching flange by screws.

According to another feature of the invention, the resilient annular member is non-rotatably secured at its outer end faces as follows: The securing rings have bores parallel to the axis of rotation, and bolts are positively fitted into these bores, with the free ends of the bolts engaging in aligned bores in the flange on the jacket, or in the outer flange.

Advantageously, the bearing bushings on the collars are disposed in such a way that they are protected from axial displacement relative to the collar. To this end, according to another feature of the invention, the bearing bushings are disposed in recesses at the periphery of the collars.

According to another feature of the invention, an axial gap is left between the end faces of the collars and the respective facing flange. This ensures that when one part of the coupling shifts axially relative to the other during operation, the collars do not come in contact with the inner walls of the opposite flanges.

An important advantage of the shaft coupling according to the invention is that it comprises structurally simple and therefore cheaply-manufactured components. The two parts of the coupling are radially braced against one another by loosely-inserted bearing bushings, which are purely rotary parts and can easily be machined to the required accuracy. Another advantage is that the radial bracing occurs only in the outer peripheral region of the coupling, where it is easiest to control forces resulting from any angular shifts. In addition, the bearing bushings used for radial bracing can be given a considerable axial length, so that the bearing surfaces are large relative to the total axial length of the coupling, which is advantageous for various reasons.

DESCRIPTION OF PREFERRED EMBODIMENT

Referring now to the drawing in detail, the illustrated embodiment is of a resilient interposed cardan-shaft coupling equipped with two resilient annular members for transmitting torque. The cardan shafts of the units to be interconnected are attached on the one hand by an outer flange 1 and on the other hand by a matching flange 4, which can be secured by threaded bolts 5 to the connecting flange 3 of a cardan shaft 2. A centering bushing 6 is provided for centering the flange 4 and the other components of the inner part of the coupling. This bushing 6 extends positively through the bore of flange 4, and its inner end engages in a matching recess 7 at the inner edge of flange 3.

That end face of flange 4 which is remote from flange 3, and extends in a plane at right angles to the axis of rotation, constitutes the abutment surface for two bearing rings 8 and two securing rings 9 adjacent the outer sides of the bearing rings. These four rings, which make up adjacent layers, are all secured to flange 4 by threaded bolts 10. Advantageously, the bores in the rings are given a clearance relative to the bolts, so that the rings are centered exclusively by the bushing 6, on which the inner bores of the rings are positively held. In order to secure the bushing 6 in its axial position, the outer wall of the bushing is provided with an annular projection 11 which engages in a corresponding recess 12 in flange 4.

Each of the two rings 9 is secured to an annular member 13 which is made of an elastomeric material such as rubber or the like, and is provided with an additional securing ring 14 at its opposite end face. The outer rings 14 have a number of uniformly distributed peripheral bores 15, each receiving a bolt 16, approximately half of which projects beyond the end face of ring 14. In the case of that resilient ring member 13 adjacent the outer flange 1, the bolts 16 engage in bores 17 in flange 1. In the case of the other resilient annular member, bores 18 are located in a flange 19 of a concentric jacket 20 having a retaining flange 21 which abuts the inner side of flange 1 and is firmly secured thereto by threaded bolts 22.

The outer edges of the rings 8 have collars 23 which extend coaxially with the axis of rotation and form an integral component with each bearing ring. An annular gap 24 is left between the outer surfaces of the collars 23 and the inner wall of the jacket 20. At the annular gap there are two bearing bushings 25, 26, which are received in recesses 27, 28 at the periphery of collars 23. The bushings 25, 26 radially brace the parts 1, 4 against each other.

As shown in the drawing, an axial space or cavity 30, 31 is also formed between the end faces of the collars 23 and the facing flange 1 and 19 respectively. These cavities are given an axial length such that parts 1, 4 can move longitudinally relative to one another to the desired extent. Advantageously, the resilient annular members 13 are inserted with a certain axial prestress, so that parts 1 and 4, when in the inoperative position, automatically adopt a central position relative to one another. When the expected mutual axial shifts occur during operation, the only sliding motion that occurs is between the outer surfaces of the bushings 25, 26 and the inner surface of jacket 20. The bushings 25, 26 are advantageously made of friction-bearing materials.

The sectional drawing shows another bolt 32, which is disposed in a bore 33 in the outer flange 1 and has a head 34 at its inner end extending beyond the axial width of cavity 30. Near the head, the outer edge of collar 23 is formed with a recess 35 which surrounds head 34 with sufficient clearance to prevent contact between collar 23 and head 34 during normal operation of the coupling. Advantageously, at least two such bolts 32 are disposed at diametrically opposite locations in the coupling. They provide an emergency safeguard which comes into operation if the resilient annular members are damaged, e.g. by overloading or wear.

The present invention is, of course, in no way restricted to the specific disclosure of the specification and drawing, but also encompasses any modifications within the scope of the appended claims.

What I claim is:

1. A resilient rotatable shaft coupling having an axis of rotation for operatively interconnecting two coupling parts including inner and outer coupling parts therewith in such a way that they are radially braced against one another yet have limited freedom of axial movement, said coupling comprising:

an outer flange provided on the outer coupling part;
a cylindrical jacket secured at one end thereof to said outer flange, said jacket having an inner wall and being concentric with the axis of rotation of said coupling, the other end of said jacket being provided with a radially inwardly projecting flange which is perpendicular to said axis of rotation;
a fitting flange provided on the inner coupling part;
bearing rings rigidly secured to said fitting flange and located between said outer flange and inwardly projecting flange of said jacket, said bearing ring being provided with an outwardly directed collar which is coaxial with said axis of rotation and is separated from said inner wall of said jacket by a narrow annular gap;
at least one bearing bushing disposed in said annular gap and resting against said outer collar and said jacket;
two resilient annular members disposed radially inwardly of said collar near the radially inner surface thereof, said resilient annular members comprising an elastomeric material and being provided with axial end faces, rigid securing rings provided on said axial end faces of said annular members including therewith securing rings which face one another and those securing rings located on axially outer end faces of said annular members, said resilient annular members being non-rotatably secured to said securing ring which is secured to said fitting flange and to said outer flange for effecting their interconnection, and two bearing rings, each having a collar and a bearing bushing, said bearing rings and said annular members being disposed back to back on said fitting flange and in mirror image relationship relative to a central plane which is transverse to said axis of rotation, that resilient annular member located remote from said outer flange being non-rotatably secured to said inwardly projecting flange of said jacket, those securing rings located on those axial end faces of said resilient annular members which face one another being located between said annular members and an associated bearing ring, and extending radially inwardly beyond the thickness of said annular member, and bolts for connecting these last mentioned securing rings located on those axial end faces of said resilient annular members which face one another, together with said bearing rings, to said fitting flange.

2. A shaft coupling according to claim 1, in which those securing rings located on the axially outer end faces of said resilient annular members are provided with bores which are parallel to said axis of rotation; in which said inwardly projecting flange of said jacket, and said outer flange, include bores which are respectively aligned with said bores in said last mentioned securing rings; and which includes bolts positively fitted in said aligned bores.

3. A shaft coupling according to claim 2, in which said outer collar of said bearing ring is provided with a recess, said bearing bushing being disposed in said recess.

4. A shaft coupling according to claim 3, which includes an axial gap between said outer collar of said bearing ring and said outer flange and said inwardly projecting flange respectively.

* * * * *